US009538534B2

(12) United States Patent
Mizusawa

(10) Patent No.: US 9,538,534 B2
(45) Date of Patent: Jan. 3, 2017

(54) COMMUNICATION CONTROL APPARATUS AND COMMUNICATION CONTROL METHOD FOR ASSIGNING RESOURCES FOR RELAY OF DATA TRAFFIC

(71) Applicant: Sony Corporation, Tokyo (JP)

(72) Inventor: Nishiki Mizusawa, Kanagawa (JP)

(73) Assignee: Sony Corporation, Tokyo (JP)

(*) Notice: Subject to any disclaimer, the term of this patent is extended or adjusted under 35 U.S.C. 154(b) by 90 days.

(21) Appl. No.: 14/409,531

(22) PCT Filed: May 29, 2013

(86) PCT No.: PCT/JP2013/064911
§ 371 (c)(1),
(2) Date: Dec. 19, 2014

(87) PCT Pub. No.: WO2014/027496
PCT Pub. Date: Feb. 20, 2014

(65) Prior Publication Data
US 2015/0189652 A1 Jul. 2, 2015

(30) Foreign Application Priority Data

Aug. 13, 2012 (JP) .................................. 2012-179280

(51) Int. Cl.
*H04B 7/00* (2006.01)
*H04W 72/04* (2009.01)
(Continued)

(52) U.S. Cl.
CPC ..... *H04W 72/0453* (2013.01); *H04B 7/15542* (2013.01); *H04L 5/0032* (2013.01);
(Continued)

(58) Field of Classification Search
CPC ............... H04W 72/04; H04W 72/044; H04W 72/0446; H04W 72/0453
(Continued)

(56) References Cited

U.S. PATENT DOCUMENTS 6,766,170 B1* 7/2004 Aretz .................. H04B 7/2606
370/331
7,583,619 B2* 9/2009 Edwards ............ H04B 7/15557
370/279
(Continued)

FOREIGN PATENT DOCUMENTS

EP        2309813 A2    4/2011

OTHER PUBLICATIONS

Feb. 29, 2016, Extended European Search Report for related EP Application No. 13879524.0.
(Continued)

*Primary Examiner* — Dmitry H Levitan
(74) *Attorney, Agent, or Firm* — Paratus Law Group, PLLC

(57) ABSTRACT

Provided is a communication control apparatus including a communication unit configured to receive, from a base station of a radio communication system, grant information that specifies a resource for relay within a frequency resource assigned to a radio communication system operated with a frequency division duplex scheme, the resource for relay being granted to be used for relay of traffic, and a relay control unit configured to relay the traffic with a time division duplex scheme on the resource for relay during a period that is associated with the grant information.

12 Claims, 13 Drawing Sheets

(51) Int. Cl.
*H04W 72/12* (2009.01)
*H04L 5/00* (2006.01)
*H04L 5/14* (2006.01)
*H04B 7/155* (2006.01)
*H04W 84/04* (2009.01)

(52) U.S. Cl.
CPC ............... *H04L 5/14* (2013.01); *H04W 72/12* (2013.01); *H04W 84/047* (2013.01)

(58) Field of Classification Search
USPC .................... 370/310, 328, 329, 343, 345
See application file for complete search history.

(56) References Cited

U.S. PATENT DOCUMENTS

| | | | | |
|---|---|---|---|---|
| 8,532,015 B2* | 9/2013 | Che | ................... | H04W 72/0426 |
| | | | | 370/315 |
| 8,537,724 B2* | 9/2013 | Love | ................... | H04B 7/15528 |
| | | | | 370/280 |
| 8,909,157 B2* | 12/2014 | Kruglick | ........... | H04W 72/0426 |
| | | | | 370/246 |
| 9,014,079 B2* | 4/2015 | Wiberg | ...................... | 370/315 |
| 9,094,952 B2* | 7/2015 | Chun | ...................... | H04W 72/04 |
| 9,226,272 B2* | 12/2015 | Lee | ...................... | H04L 1/0026 |
| 9,300,393 B2* | 3/2016 | Lin | ...................... | H04B 7/155 |
| 2008/0316954 A1* | 12/2008 | Zheng | .................. | H04B 7/2606 |
| | | | | 370/315 |
| 2012/0275352 A1* | 11/2012 | Diao | .................. | H04B 7/15542 |
| | | | | 370/280 |

OTHER PUBLICATIONS

China Potevio Co., Ltd, "Relays with Different Scheduling Methods", 3GPP TSG RAN WG1 Meeting #56, Feb. 9-13, 2009, pp. 1-10, Athens, Greece.

Panasonic, "Physical Cell ID and Scheduling options for LTE-ADV", 3GPP TSG-RAN WG1 Meeting #56, Feb. 9-13, 2009, pp. 1-4, Athens, Greece.

\* cited by examiner

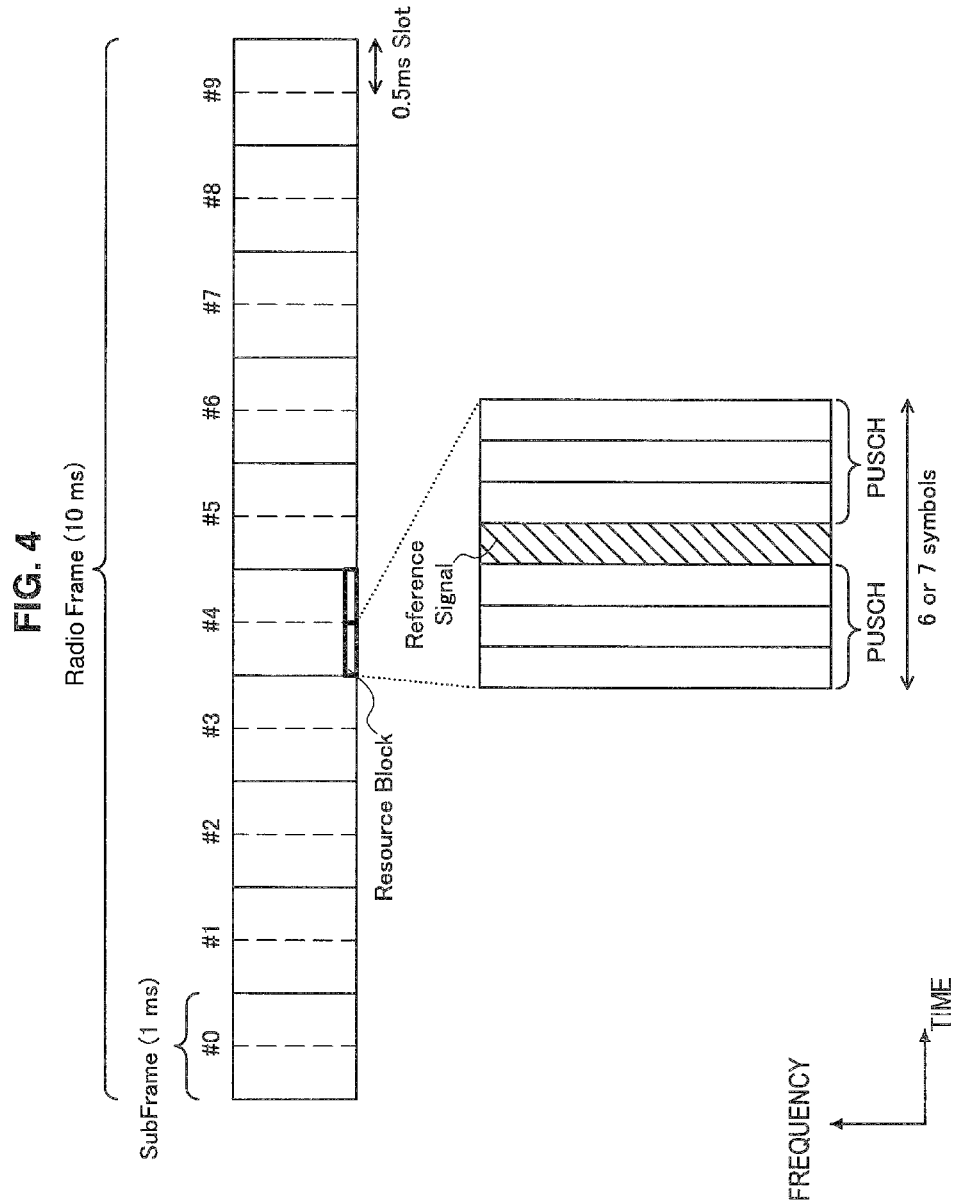

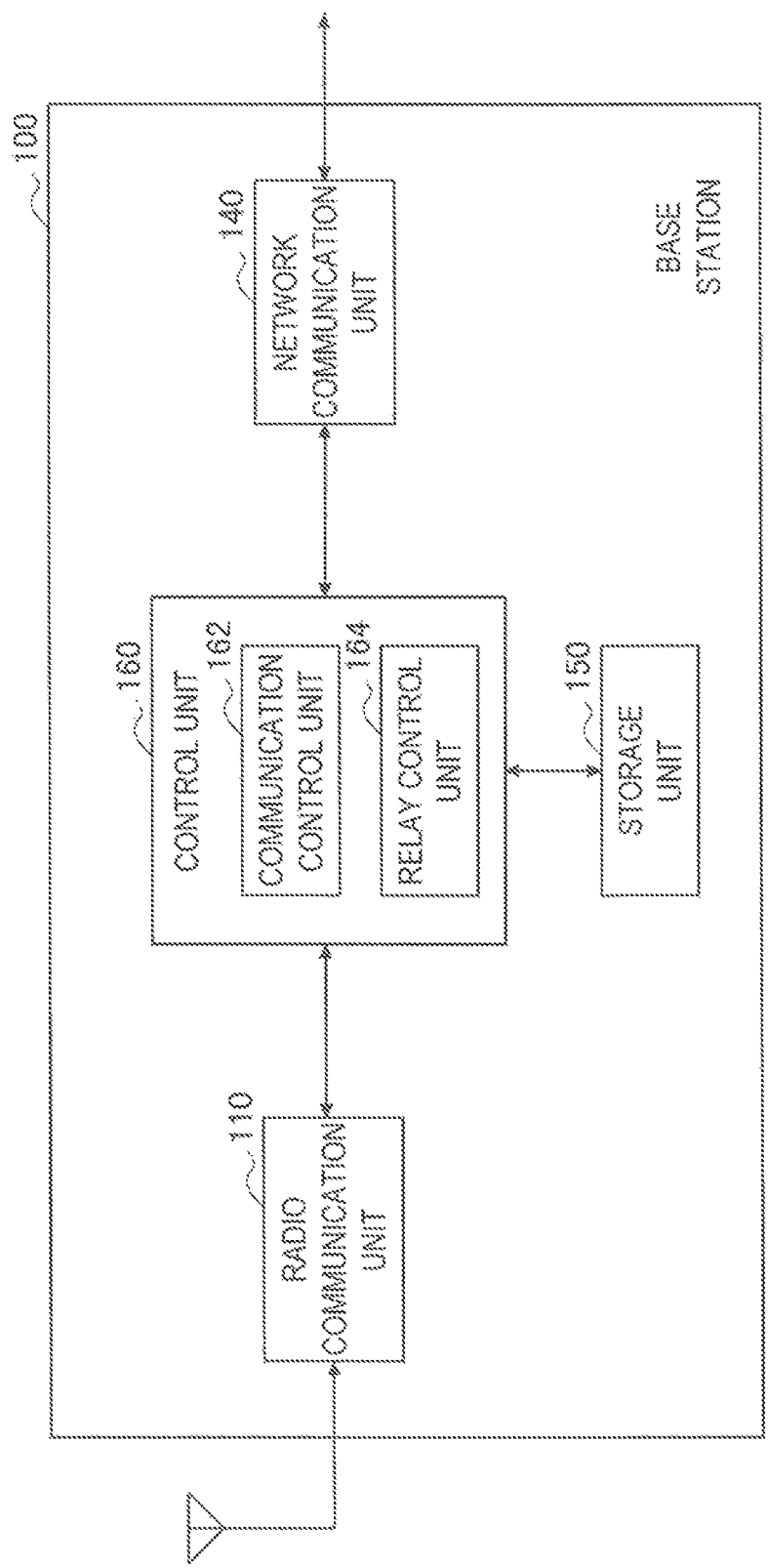

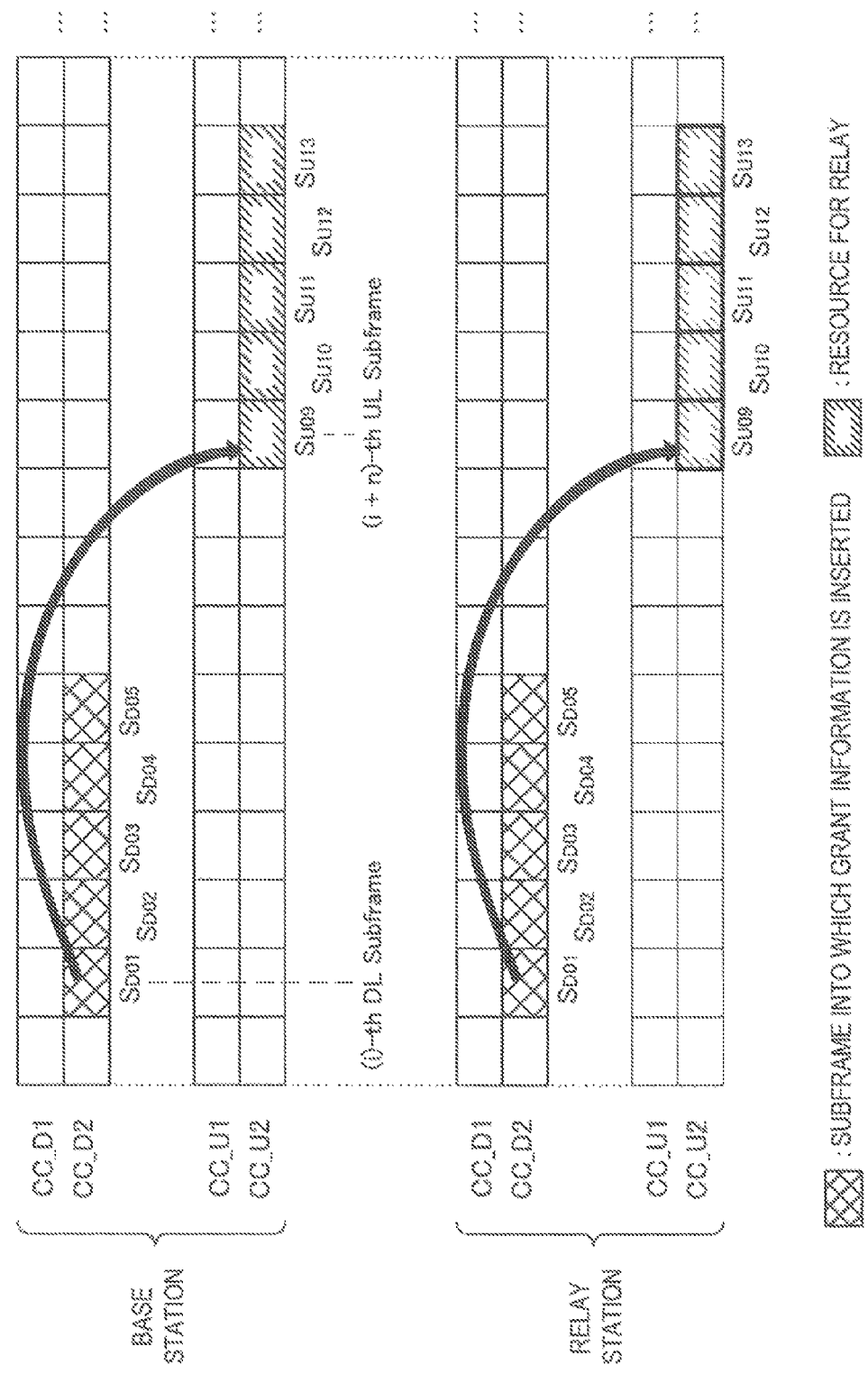

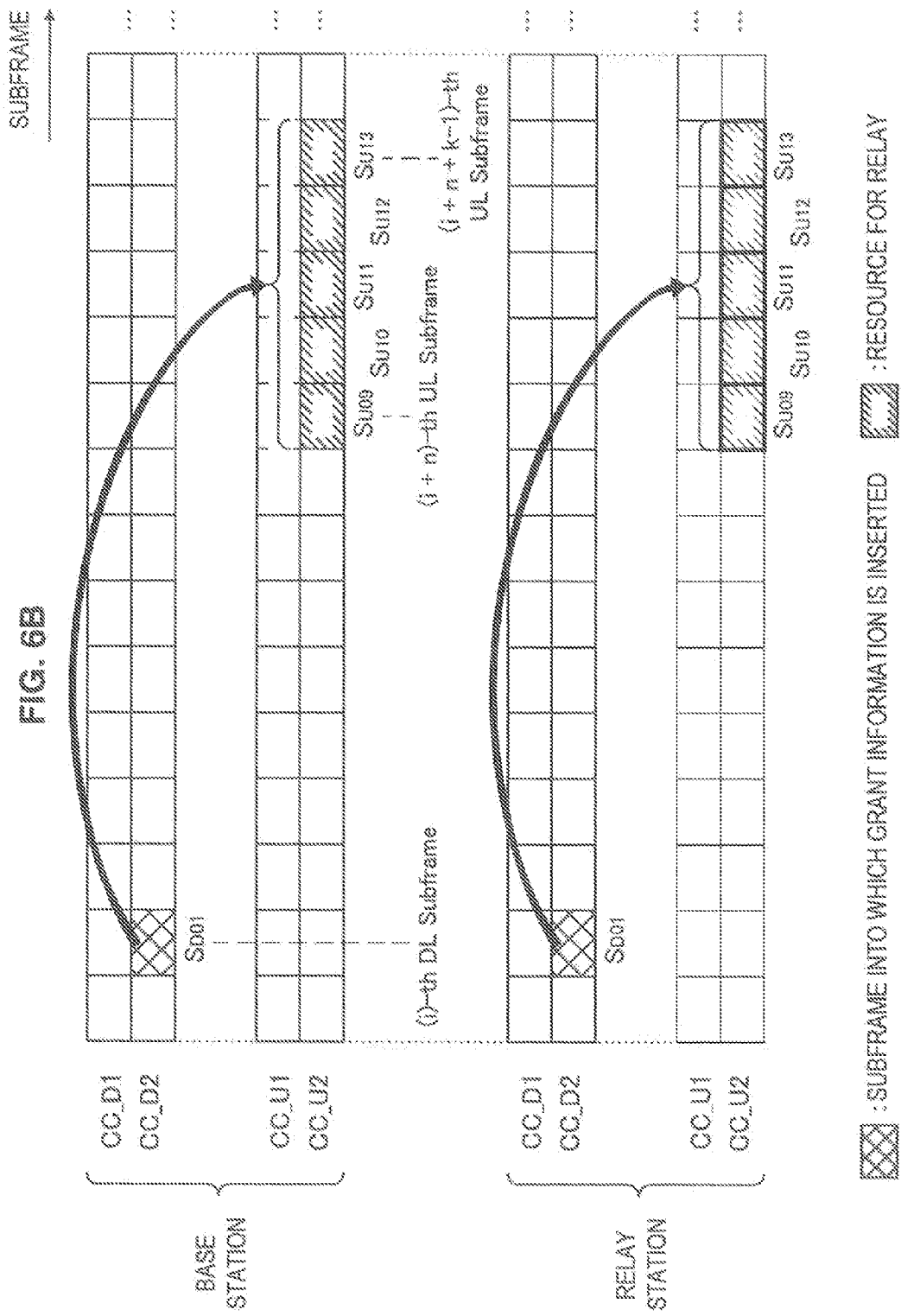

COMMUNICATION CONTROL APPARATUS AND COMMUNICATION CONTROL METHOD FOR ASSIGNING RESOURCES FOR RELAY OF DATA TRAFFIC

TECHNICAL FIELD

The present invention relates to a communication control apparatus and a communication control method.

BACKGROUND ART

The radio communication technology is faced by a problem of a lack of frequency resources due to recent rapid increase in data traffic. One of examples of major solutions to use frequency resources efficiently is to introduce a relay station. A relay station relays traffic for a terminal located inside a cell or in the vicinity thereof where radio waves are weak (e.g., behind a building, inside a building, or near a cell edge). The usage efficiency of frequency resources can be improved by a relay station reusing frequency resources assigned by a radio communication system for relay.

Patent Literature 1 below discloses a technique in which a relay station relays traffic in accordance with a schedule decided by a base station.

CITATION LIST

Patent Literature
Patent Literature 1: JP 2011-77987A.

SUMMARY OF THE INVENTION

Technical Problem

However, in a situation in which a relay station is present between a base station and a terminal, the base station cannot directly recognize the situation (position, ability, communication quality, and the like) of the terminal. Accordingly, it is not easy for the base station to decide the best schedule of relay. Therefore, it is effective that a base station authorizes the relay station to control scheduling or the like for relay. Note that since the amount of data traffic always changes, it is desirable to dynamically perform the authorization in a time division manner, not in a persistent manner, in terms of the usage efficiency of a frequency resource.

Solution to Problem

According to the present disclosure, there is provided a communication control apparatus including a communication unit configured to receive, from a base station of a radio communication system, grant information that specifies a resource for relay within a frequency resource assigned to a radio communication system operated with a frequency division duplex scheme, the resource for relay being granted to be used for relay of traffic, and a relay control unit configured to relay the traffic with a time division duplex scheme on the resource for relay during a period that is associated with the grant information.

Further, according to the present disclosure, there is provided a communication control apparatus including a communication control unit configured to operate, on a frequency resource assigned to a radio communication system, the radio communication system with a frequency division duplex scheme, a relay control unit configured to decide a resource for relay within the frequency resource, and to generate grant information that is associated with a period during which relay is granted, the resource for relay being granted to be used for relay of traffic, and a communication unit configured to transmit the generated grant information.

Further, according to the present disclosure, there is provided a communication control method including receiving, from a base station of a radio communication system, grant information that specifies a resource for relay within a frequency resource assigned to the radio communication system operated with a frequency division duplex scheme, the resource for relay being granted to be used for relay of traffic, and relaying the traffic with a time division duplex scheme on the resource for relay during a period that is associated with the grant information.

Further, according to the present disclosure, there is provided a communication control method including operating a radio communication system with a frequency division duplex scheme on a frequency resource assigned to the radio communication system, deciding a resource for relay granted to be used for relay of traffic within the frequency resource, generating the grant information that specifies the resource for relay and that is associated with a period during which relay is granted, and transmitting the generated grant information to an apparatus that relays the traffic.

Advantageous Effects of Invention

According to the technique of the present disclosure, it is possible to achieve a mechanism of effective relay in terms of the usage efficiency of a frequency resource.

BRIEF DESCRIPTION OF DRAWINGS

FIG. 4 is an explanatory diagram showing an example of an uplink frame format.

FIG. 5 is a block diagram showing an example of a configuration of a base station according to an embodiment.

FIG. 6A is an explanatory diagram showing a first example of grant information transmitted from a base station.

FIG. 6B is an explanatory diagram showing a second example of grant information transmitted from a base station.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference indicators, and repeated explanation is omitted.

The description will be made in the following order.
1. Outline of technology according to present disclosure
1-1. Outline of system
1-2. Configuration example of resource
1-3. Description of problems
2. Configuration of base station
2-1. Configuration example of apparatus
2-2. Example of flow of processing
3. Configuration of relay station
3-1. Configuration example of apparatus
3-2. Example of flow of processing
4. Configuration of terminal
5. Conclusion

1. OUTLINE OF TECHNOLOGY ACCORDING TO PRESENT DISCLOSURE

[1-1. Outline of System]

Figure 1:
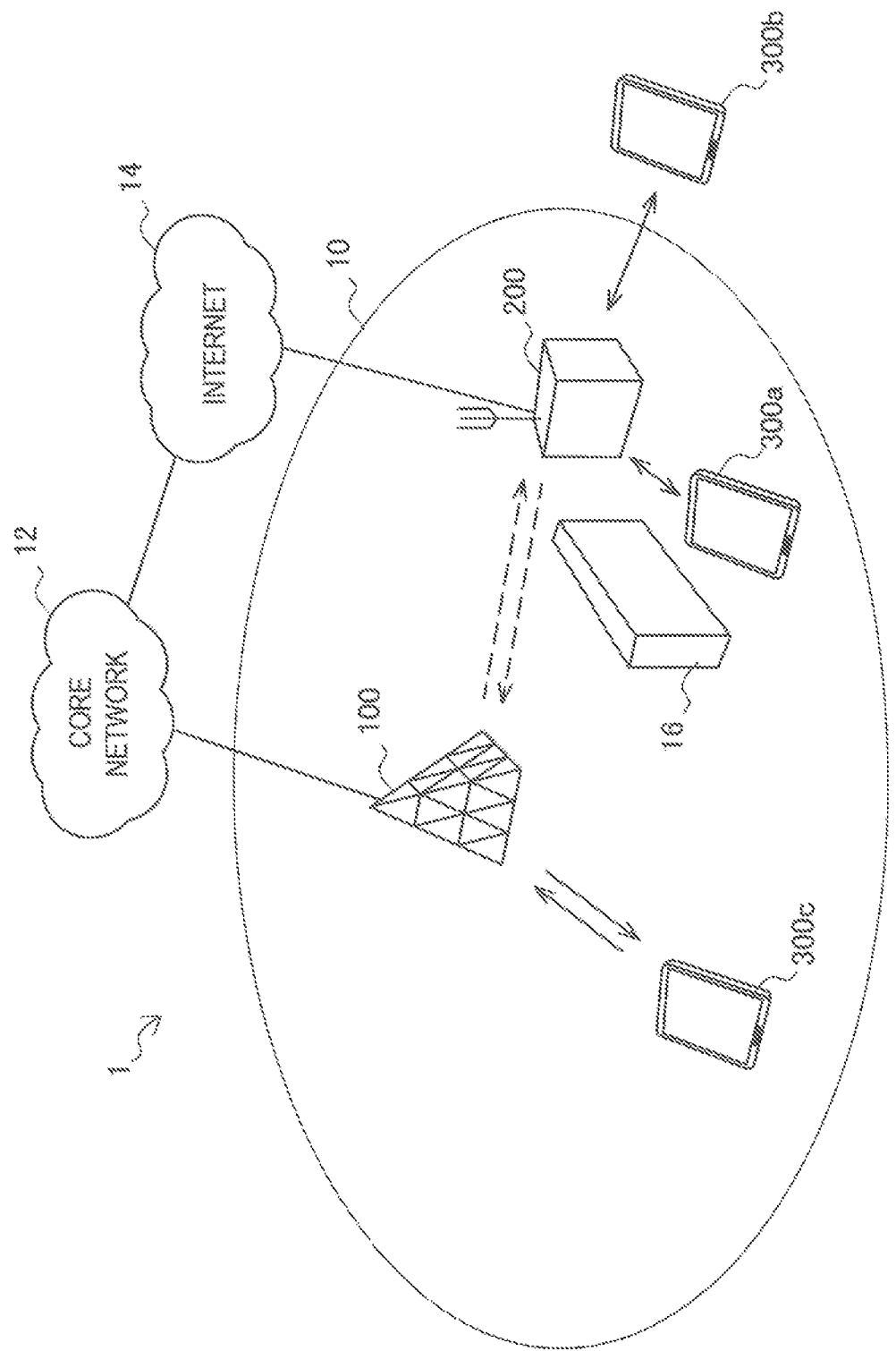
FIG. 1 is an explanatory diagram showing an outline of a communication control system according to an embodiment.

FIG. 1 is an explanatory diagram showing an outline of a communication control system 1 according to an embodiment of the technology according to the present disclosure. Referring to FIG. 1, the communication control system 1 includes a base station 100, a relay station 200, and terminal apparatuses 300a, 300b, and 300c.

The base station 100 is a communication control apparatus that operates a radio communication system on a frequency resource assigned to (for example, granted legally or a use right of which is given) a radio communication system. The base station 100 transmits and receives radio signals to/from a terminal apparatus located within a cell 10 with a frequency division duplex (FDD) scheme. A frequency resource used for transmission of radio signals from the terminal apparatus to the base station 100 is referred to as uplink resource, and a frequency resource used for transmission of radio signals from the base station 100 to the terminal apparatus is referred to as downlink resource. The base station 100 may be operated as eNB (evolved node B) with an LTE-A (long term evolution-advanced) scheme, for example. Alternatively, the base station 100 may be operated in accordance with a cellular communication scheme of a different type, such as W-CDMA (wideband-code division multiple access). The base station 100 is connected to a core network 12.

The relay station 200 is a communication control apparatus that relays, when use of a frequency resource for relay is granted, traffic on the granted frequency resource. The relay station 200 transmits and receives radio signals to/from a terminal apparatus with a time division duplex (TDD) scheme, the terminal apparatus being located at a point where radio waves from the base station 100 is weak. The relay station 200 has a communication link with the base station 100. The relay station 200 may be connected to an internet 14.

Each of the terminal apparatuses 300a, 300b, and 300c is a radio communication terminal. In the example shown in FIG. 1, the terminal apparatus 300a is located behind an obstacle 16 and so cannot receive radio signals from the base station 100 favorably. Further, the terminal apparatus 300b is located in the vicinity of the edge of the cell 10 and so cannot receive radio signals from the base station 100 favorably. Accordingly, the relay station 200 relays traffic via an air interface between the base station 100 and the terminal apparatuses 300a and 300b on the frequency resource that is granted to be used for relay (hereinafter referred to as resource for relay). In this embodiment, relay is performed with the TDD scheme. That is, the relay station 200 transmits radio signals to the terminal at a certain timing, and receives radio signals from the terminal at a different timing. The terminal apparatus 300c is located at a point where radio signals from the base station 100 can be received favorably, and so communicates with the base station 100 directly. Note that, in the present specification, in a case in which the terminal apparatuses 300a, 300b, and 300c do not need to be discriminated from each other, the terminal apparatuses 300a, 300b, and 300c are collectively referred to as terminal apparatus 300 by omitting the alphabetical characters after the reference numeral. The same holds true for other structural elements.

The relay station 200 may be an apparatus dedicated to relay of traffic, a general apparatus having a relay function and another function, or the like. The terminal apparatus 300 may be any kind of radio communication terminal such as a smartphone, a personal computer (PC), a personal digital assistant (PDA), a portable navigation device (PND), or a game terminal. The same holds true for the relay station 200. The terminal apparatus 300 may be a dual mode terminal that can be operated with both the FDD scheme and the TDD scheme.

[1-2. Configuration Example of Resource]

Figure 2:
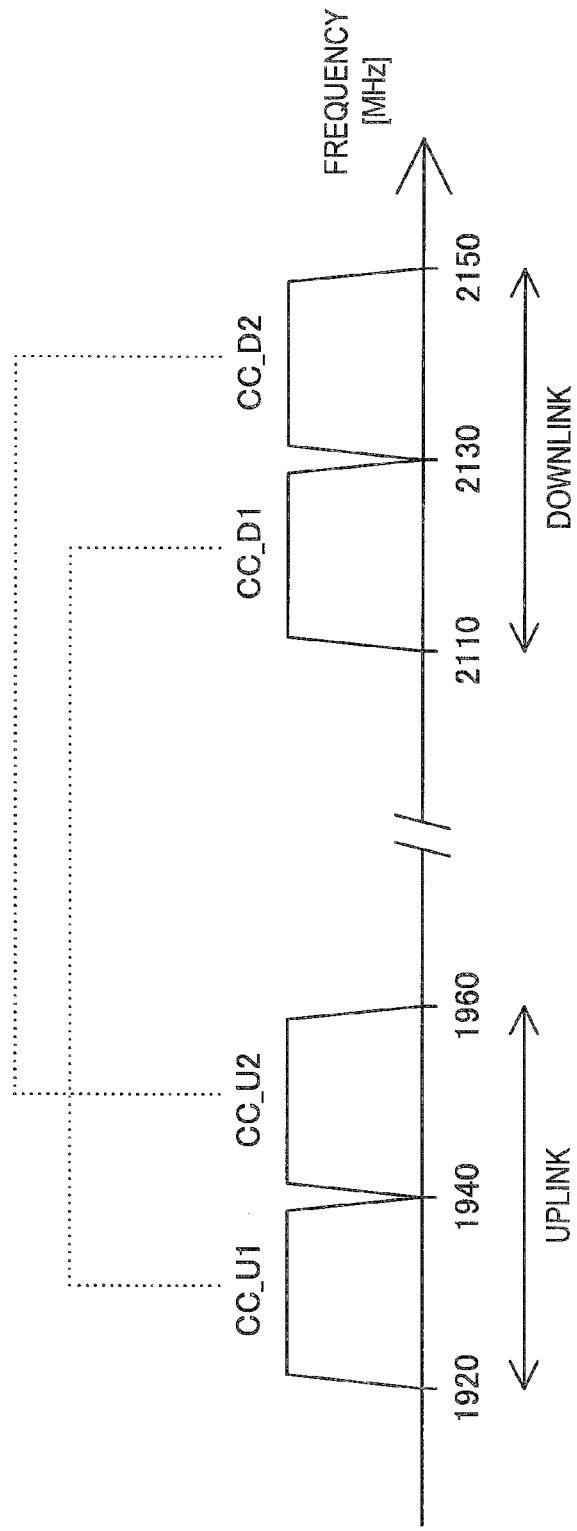
FIG. 2 is an explanatory diagram showing an example of carrier aggregation.

Next, referring to FIG. 2 to FIG. 4, an example of a resource configuration will be described. The technology according to the present disclosure typically assumes a resource configuration in which an individual resource is specified by frequency and time. A resource of a cell operated with the FDD scheme is divided into the uplink resource and the downlink resource in a frequency region. The uplink resource and the downlink resource can each be further divided into smaller units of a frequency resource. In addition, one or more units of a frequency resource can be selected as the resource for relay.

As an example, in the LTE-A scheme, the carrier aggregation technique enables the uplink resource and the downlink resource of a cell to be configured by integration of a plurality of component carriers. The more the concurrently usable component carriers are in number, the higher the data rate becomes; however, the number of usable component carriers is dependent on the capability of the device. FIG. 2 is an explanatory diagram showing an example of carrier aggregation. Referring to FIG. 2, four component carriers CC_U1, CC_U2, CC_D1, and CC_D2 are shown. The component carrier CC_U1 is an uplink resource (uplink CC) occupying a band from 1920 MHz to 1940 MHz. The component carrier CC_U2 is an uplink resource (uplink CC) occupying a band from 1940 MHz to 1960 MHz. The component carrier CC_D1 is a downlink resource (downlink CC) occupying a band from 2110 MHz to 2130 MHz. The component carrier CC_D2 is a downlink resource (downlink CC) occupying a band from 2130 MHz to 2150 MHz. Among the component carriers, for example, when the component carriers CC_U1 and CC_D1 are paired, a grant for uplink transmission on the component carrier CC_U1 is broadcasted from a base station on the component carrier CC_D1. In a similar manner, when the component carriers CC_U2 and CC_D2 are paired, a grant for uplink transmission on the component carrier CC_U2 is broadcasted from the base station on the component cattier CC_D2.

Figure 3:
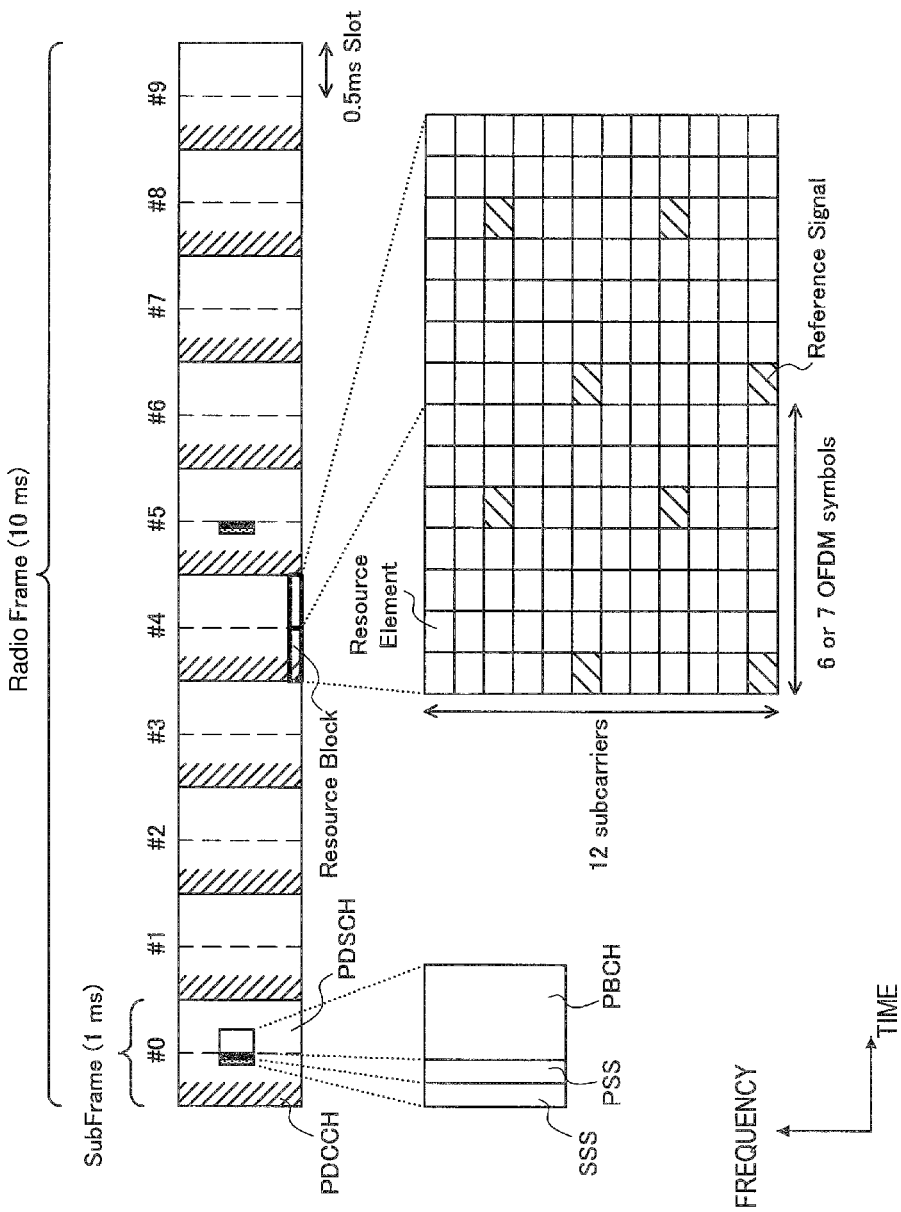
FIG. 3 is an explanatory diagram showing an example of a downlink frame format.

FIG. 3 is an explanatory diagram showing an example of a downlink frame format in an LTE-A scheme. Referring to FIG. 3, one radio frame having a time length of 10 ms is shown. The one radio frame is composed of 10 subframes #0 to #9 each having a time length of 1 ms. Each subframe is composed of two time slots each having a time length of 0.5 ms. One time slot includes seven OFDM symbols (six OFDM symbols in a case in which an extended cyclic prefix is used) in a time region. The traffic is scheduled (the downlink is assigned) in a unit of a resource block. Each resource block includes one time slot in the time region and twelve subcarriers in the frequency region. A resource element is a unit that is smaller than the resource block and is specified by one ODFM symbol and one subcarrier.

A primary synchronization signal (PSS) and a secondary synchronization signal (SSS) are inserted to the first half of each time slot from the 0-th downlink subframe (#0) to the 5-th downlink subframe (#5). PSS and SSS are used by the terminal to synchronize with the cell and to identify individual cells. The position of frequency of PSS and SSS is fixed to the center of the frequency channel regardless of the bandwidth. After PSS of the 0-th downlink subframe, a physical broadcast channel (PBCH) is disposed. A master information block (MIB) including static system information is transferred on a broadcast channel (BCH) mapped on PBCH. MIB includes information on the downlink bandwidth, the number of transmission antennas of the base station, control information configuration, and the like, for example. Meanwhile, a system information block (SIB) that transfers dynamic system information is transferred on a downlink shared channel (DL-SCH) mapped on the physical downlink shared channel (PDSCH). SIB includes information on the uplink bandwidth, parameters for random access, power control parameters, adjacent cell information, and the like, in some resource elements within each resource block, a reference signal that is used when the terminal measures channel quality is disposed. The position of the reference signal can be shifted according to the cell. Scheduling information is transferred on a physical downlink control channel (PDCCH). The scheduling information includes downlink assignment that is scrambled by using identification information associated with each terminal (e.g., radio network temporary identifier (RNTI)). Each terminal can descramble the scheduling information by using the identification information assigned to the terminal and acquire downlink assignment of the terminal.

FIG. 4 is an explanatory diagram showing an example of an uplink frame format in an LTE-A scheme. Also in the uplink, one radio frame is composed of 10 subframes #0 to #9 each having a time length of 1 ms. Each subframe is composed of two time slots each having a time length of 0.5 ms. One time slot includes seven or six SC-FDMA symbols in the time region. The traffic is scheduled (the uplink is granted) in a unit of a resource block. The uplink grant is shown normally by the scheduling information on PDCCH of a downlink subframe that is 4 frames earlier than the granted uplink subframe. In a manner similar to that of the downlink assignment, the uplink grant can be scrambled by using the identification information associated with each terminal. On the fourth symbol of each resource block, a reference signal of the uplink is disposed.

[1-3. Description of Problems]

In a case in which the relay station relays traffic by using a part of a frequency resource, a base station can easily suppress interference due to relay signals, by selecting an uplink resource as the resource for relay. This is because interference generated on the uplink resource influences only reception quality of an uplink signal in the base station. Further, eNB of the LIE-A scheme has a mechanism to control communication for each component carrier in order to secure backward compatibility with a terminal that does not support carrier aggregation. Accordingly, when control of relay is authorized in a unit of a component carrier, dynamic authorization becomes possible comparatively easily without changing the existing mechanism largely. Accordingly, in this embodiment, the base station 100 selects the uplink CC as the resource for relay in a unit of a component carrier. Note that in other embodiments, the downlink resource may be selected as the resource for relay. Further, the resource for relay may be selected in a unit other than the component carrier.

2. CONFIGURATION OF BASE STATION

Next, the base station 100 will be described with reference to FIG. 5 to FIG. 7.

[2-1. Configuration Example of Apparatus]

FIG. 5 is a block diagram showing an example of a configuration of the base station 100 according to an embodiment. Referring to FIG. 5, the base station 100 includes a radio communication unit 110, a network communication unit 140, a storage unit 150, and a control unit 160.

(1) Radio Communication Unit

The radio communication unit 110 is a radio communication interface that is operated with the FDD scheme. The radio communication unit 110 transmits downlink signals on the downlink resource and receives uplink signals on the uplink resource to/from the terminal apparatus 300 that is connected to the base station 100. Further, in this embodiment, the radio communication unit 110 transmits grant information that specifies the resource for relay. The grant information is associated with a period during which relay is granted (hereinafter referred to as relay period). The radio communication unit 110 may broadcast the grant information as a piece of the scheduling information or system information on the downlink resource (e.g., the uplink CC to be released for relay or the downlink CC to be paired), for example. Accordingly, it becomes possible to notify an apparatus located within the cell 10 about the grant information without providing a channel dedicated to the grant information.

Further, the radio communication unit 110 may scramble the grant information to be broadcasted by using the identification information that is defined commonly for an apparatus that decodes the grant information. In this case, in a manner similar to an operation of acquiring normal scheduling information, each apparatus can acquire the grant information. An apparatus that is not involved in relay does not need to be conscious of the existence of the grant information. Accordingly, it becomes possible to notify the grant information while maintaining the frame of existing scheduling information.

(2) Network Communication Unit

The network communication unit 140 is a communication interface that is connected to the core network 12 shown in FIG. 1. The network communication unit 140 forwards a communication packet included in uplink signals received by the radio communication unit 110 to the core network 12. Further, the network communication unit 140 receives a communication packet to be transmitted by use of downlink signals from the core network 12. Furthermore, the network communication unit 140 exchanges control signaling with a control node (e.g., mobility management entity (MME)) on the core network 12 (via an S1 interface, for example). The network communication unit 140 also exchanges control signaling with a base station of an adjacent cell (via an X2 interface, for example).

(3) Storage Unit

The storage unit 150 stores a program and data for operations of the base station 100 by using a storage medium such as a hard disk or a semiconductor memory.

(4) Control Unit

The control unit 160 controls general operations of the base station 100 by using a processor such as a central processing unit (CPU) or a digital signal processor (DSP). In this embodiment, the control unit 160 includes a communication control unit 162 and a relay control unit 164.

The communication control unit 162 operates a radio communication system with the FDD scheme on a frequency resource that is assigned to the system of the macrocell. In the example shown in FIG. 2, frequency bands of 1920 to 1960 MHz and of 2110 to 2150 MHz are assigned. The communication control unit 162 can divide these frequency bands into four component carriers CC_U1, CC_U2, CC_D1, and CC_D2, for example, to use the component carriers CC_U1 and CC_U2 as the uplink CC and the component carriers CC_D1 and CC_D2 as the downlink CC.

In this embodiment, the communication control unit 162 has a function as a scheduler. The communication control unit 162 grants, for example, uplink transmission of the terminal on the uplink CC according to a request from the terminal that is connected to the base station 100 directly. Further, when traffic addressed to the terminal arrives a gateway on the core network 12, the communication control unit 162 assigns downlink transmission on the downlink CC to the terminal.

The relay control unit 164 decides the resource for relay that is granted to be used for relay of traffic, within the frequency resource assigned to the relay communication system. In this embodiment, the resource for relay is included in the uplink resource. As an example, the grant of the resource for relay is given in a unit of a component carrier in the frequency region, and in a unit of a subframe in the time region. Note that, without limitation to this example, the grant of relay may be given in another unit (e.g., a unit of a radio frame).

For example, the relay control unit 164 may predict future use rate of the frequency resource from the traffic amount recognized by the communication control 162 through buffer signaling, and may grant relay of the uplink CC in a period during which a vacant frequency resource is predicted. Further, the relay control unit 164 may predict temporal change in the amount of traffic on the basis of previous communication history within the cell 10. Furthermore, the relay control unit 164 may grant relay on the basis of the number of users (the number of active users) who are connected to the base station 100. The communication control unit 162 and the relay control unit 164 may cooperate with each other, and for a component carrier for which relay is decided to be granted, the scheduling of communication within the relay period may be spared by the communication control unit 162. Then, the relay control unit 164 generates the grant information associated with the relay period. The grant information generated by the relay control unit 164 is scrambled by the radio communication unit 110 and then is broadcasted on the downlink CC.

FIGS. 6A and 6B are each an explanatory diagram showing an example of the grant information transmitted from the base station 100. Referring to the upper part of FIG. 6A, in the component carrier CC_D2 among four component carriers operated by the base station 100, the grant information is inserted into subframes $S_{D01}$ to $S_{D05}$. These pieces of the grant information specify the component carrier CC_U2 as the resource for relay, for example. The position of the resource for relay in the frequency region may be specified by use of the number that is given in advance to each component carrier. Further, the grant information is associated with the period during which relay is granted. The grant information may explicitly include parameters that specify a subframe in which relay is granted (e.g., the number of a radio frame and the number of a subframe, or the number of subframes lying until the subframe in which relay is granted). Alternatively, the grant information inserted into an i-th subframe may implicitly indicate that relay is granted in an (i+n)-th subframe.

In the example shown in FIG. 6A, the grant information implicitly indicate that relay is granted in a subframe that is ahead of the subframe, into which the grant information is inserted, by n subframes (n is an integer defined in advance. For example, n=8). The grant information is inserted into the component carrier CC_D2 in each of the subframes $S_{D01}$ to $S_{D05}$. Accordingly, during the period from a subframe $S_{U09}$ to a subframe $S_{U13}$, the relay station 200 can use the component carrier CC_U2 as the resource for relay. In the example shown in FIG. 6B, the grant information explicitly includes a number n of subframes lying until the subframe which the relay period starts and a period length k of the relay period (n and k are dynamically specified). The grant information is inserted into the component carrier CC_D2 in the i-th subframe $S_{D01}$. In this case, throughout the period from the (i+n)-th subframe $S_{U09}$ to the (i+n+k−1)-th subframe $S_{U13}$, the relay station 200 can use the component carrier CC_U2 as the resource for relay.

Note that the relay control unit 164 may decide, as the resource for relay a resource that is determined to have lower risk of interfering with an adjacent cell on the basis of an indicator for inter-cell interference coordination (ICIC) notified between cells. The indicator for ICIC includes, for example, at least one of relative narrow band TX power indicator (RNTPI), high interference indicator (HII), and overload indicator (OI).

RNTPI specifies a resource block of a downlink (for which a relatively large transmission power is set) assigned to a terminal near a cell edge in a cell of RNTPI on the transmission side. The relay control unit 164 may decide preferentially, as the resource for relay, a component carrier whose ratio of the resource block is low, the resource block being specified by RNTPI received from a base station of the adjacent cell (or a CC paired with the relevant CC). Accordingly, it becomes possible to prevent relayed traffic from generating harmful interference in a large number of resource blocks of the adjacent cell.

HII specifies a resource block assigned to a terminal near the cell edge in the cell of HII on the transmission side. OI specifies a resource block to which interference beyond a threshold value in the cell of OI on the transmission side is given. The relay control unit 164 may decide preferentially, as the resource for relay, a component carrier whose ratio of the resource block is low, the resource block being specified by HII or OI received from the base station of the adjacent cell (or a CC paired with the relevant CC). Also in this case, it, becomes possible to prevent relayed traffic from generating harmful interference in a large number of resource blocks of the adjacent cell.

Further, the relay control unit 164 may notify the base station of the adjacent cell about the indicator for ICIC via the network communication unit 140 so that interference with the adjacent cell can be suppressed in the resource for relay that is granted for the cell of the macrocell. That is, the existing indicator for ICIC can also be used in order to suppress interference due to relay. For example, the relay control unit 164 can transmit HII that specifies a resource block included in the resource for relay to the base station of the adjacent cell. Accordingly it becomes possible to reduce a risk of a resource block being used in the adjacent cell, the resource block being possibly interfered owing to relayed traffic.

2-2. Example of Flow of Processing

Figure 7:
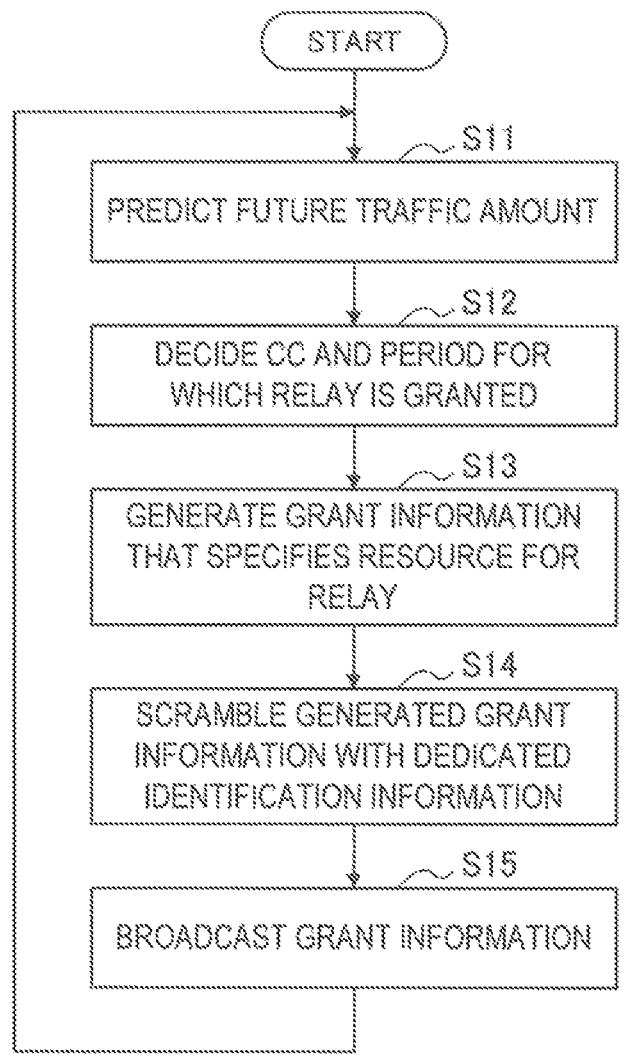
FIG. 7 is a flowchart showing an example of a flow of communication control processing by a base station according to an embodiment.

FIG. 7 is a flowchart showing an example of a flow of communication control processing by the base station 100 according to this embodiment.

Referring to FIG. 7, first, the communication control unit 162 predicts the amount of traffic of the radio communication system, the amount being assumed for some future subframes (step S11).

Next, on the basis of the predicted traffic amount, the relay control unit 164 decides a component carrier which is granted to be used for relay and a period thereof (step S12).

Next, the relay control unit 164 generates grant information that specifies the resource for relay and that is associated with the relay period (step S13).

Then, the radio communication unit 110 scrambles the grant information generated by the relay control unit 164 with the identification information that is defined commonly for an apparatus that decodes the grant information (step S14).

Then, the radio communication unit 110 broadcasts the grant information on the downlink CC (step S15).

3. CONFIGURATION OF RELAY BASE STATION

Next, the relay station 200 will be described with reference to FIG. 8 to FIG. 11.

[3-1. Configuration Example of Apparatus]

Figure 8:
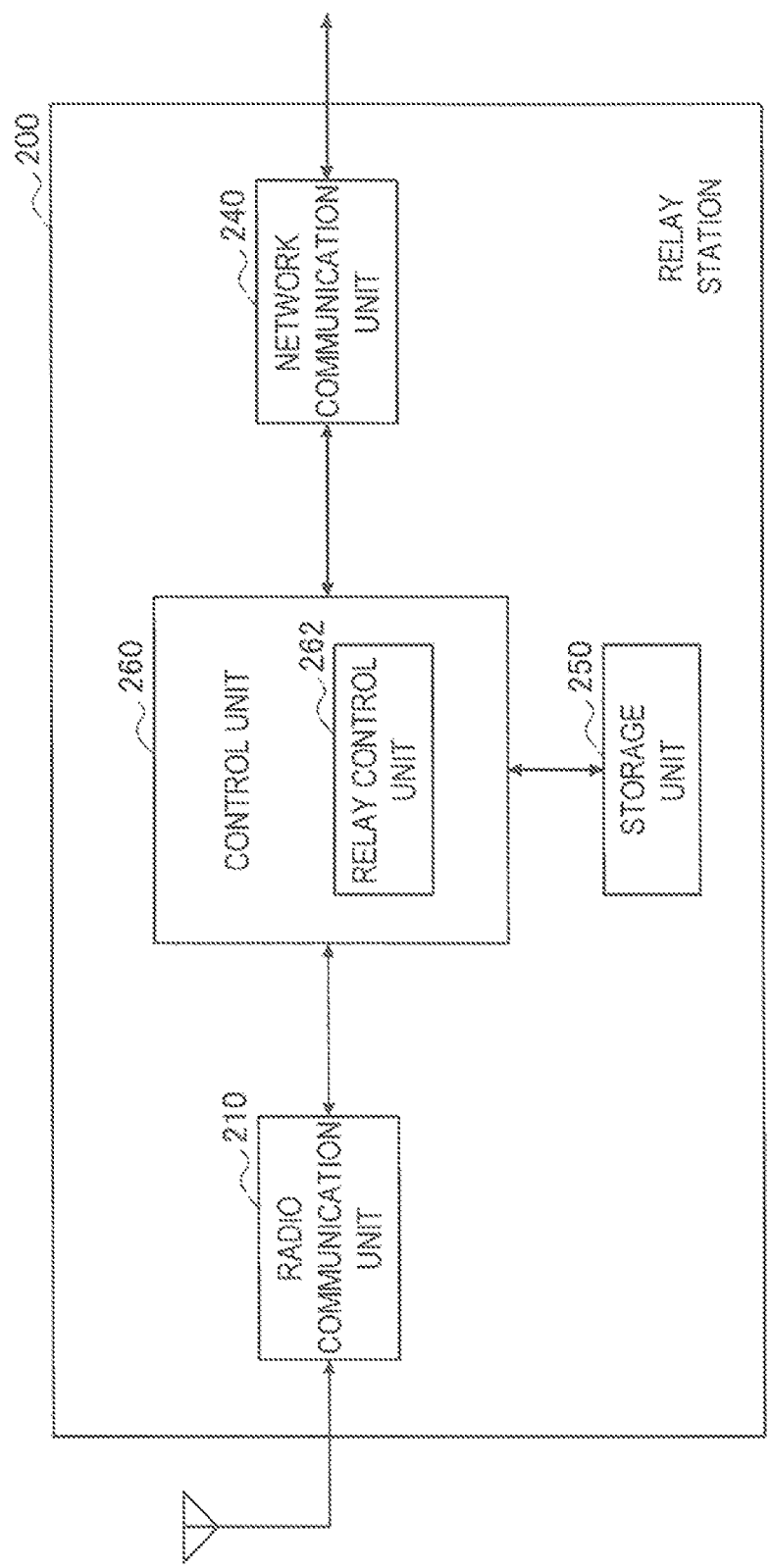
FIG. 8 is a block diagram showing an example of a configuration of a relay station according to an embodiment.

FIG. 8 is a block diagram showing an example of a configuration of relay station 200 according to an embodiment. Referring to FIG. 8, the relay station 200 includes a radio communication unit 210, a network communication unit 240, a storage unit 250, and a control unit 260.

(1) Radio Communication Unit

The radio communication unit 210 is a radio communication interface that is operated with the FDD scheme and the TDD scheme. The radio communication unit 210 is connected to the base station 100 operated with the FDD scheme and receives the above described grant information from the base station 100 on the downlink resource. The grant information specifies the resource for relay within the frequency resource assigned to the radio communication system of the base station 100 and is associated with the relay period. In this embodiment, the resource for relay is included in the uplink resource. As an example, the grant information specifies the resource for relay in a unit of a component carrier in the frequency region and is explicitly or implicitly associated with the relay period decided in a unit of a subframe in the time region. The radio communication unit 210 may receive the grant information as a piece of the scheduling information or the system information on the downlink resource, for example. The radio communication unit 210 descrambles the received grant information by using the identification information, such as RNTI, which is commonly defined for an apparatus that decodes the grant information, for example (information that has successfully performed decoding by using the identification information is the grant information).

Further, the radio communication unit 210 relays traffic for the terminal apparatus 300 (e.g., the terminal apparatuses 300a and 300b shown in FIG. 1) that has difficulty in direct communication with the base station 100 on the resource for relay specified by the grant information. The radio communication unit 210 transmits and receives radio signals to/from the terminal apparatus 300 with the TDD scheme. In this case, since the resource for relay is not divided into the uplink resource and the downlink resource in the frequency region, the guard band does not need to be secured and the resource for relay can be used efficiently. The control of relay may be performed in accordance with a radio communication scheme on any TDD basis such as a time division-long term evolution (TD-LTE) scheme or a WiMax scheme.

Figure 9:
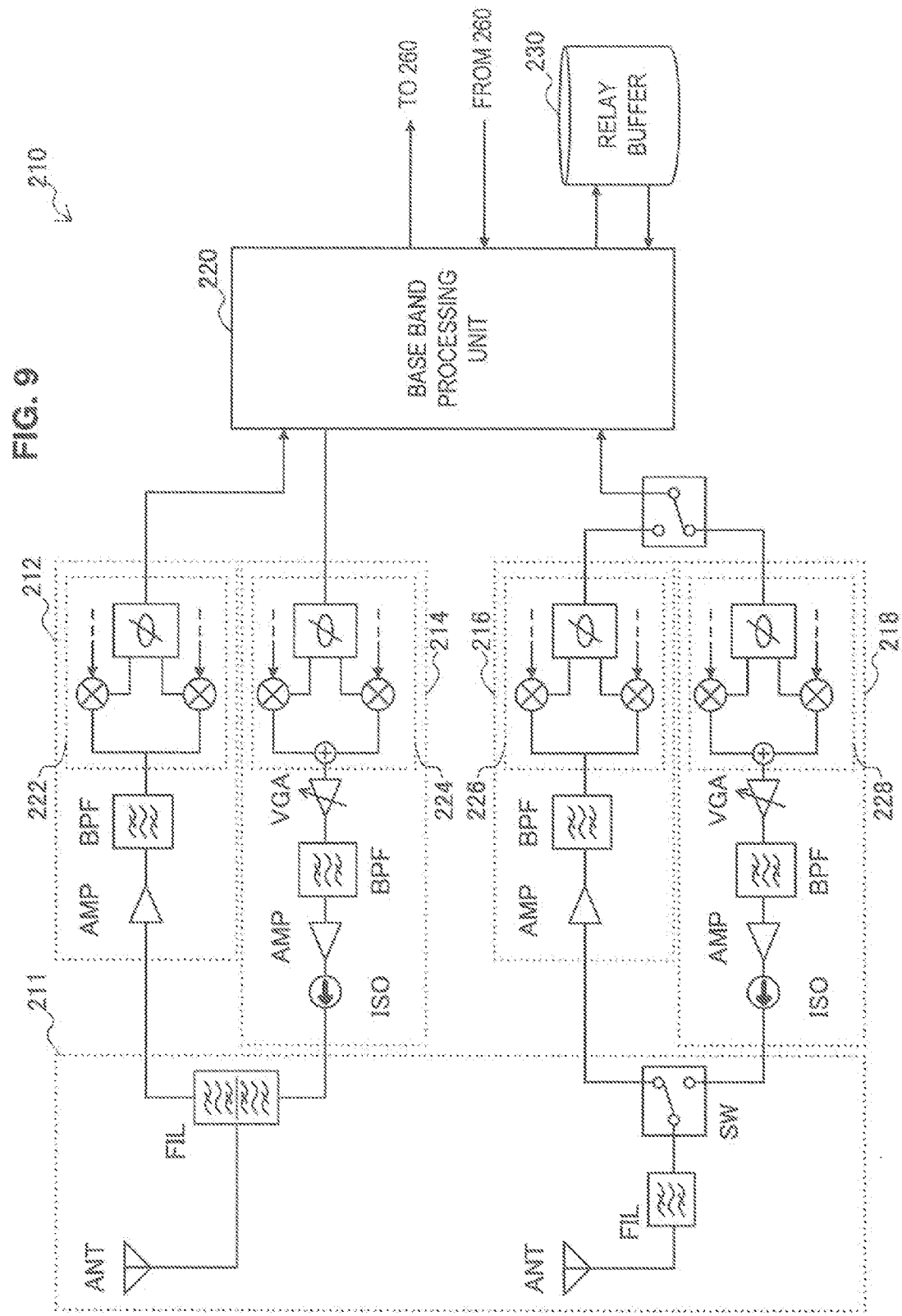
FIG. 9 is a block diagram showing an example of a detailed configuration of a radio communication unit shown in FIG. 8.

FIG. 9 is a block diagram showing an example of a detailed configuration of the radio communication unit 210 shown in FIG. 8. Referring to FIG. 9, the radio communication unit 210 includes an antenna section 211, a first reception section 212, a first transmission section 214, a second reception section 216, a second transmission section 218, a base band processing unit 220, and a relay buffer 230.

The antenna section 211 includes two transmission and reception antennas (ANT), a filter (FIL), and an antenna switch (SW). Without limitation to the example shown in FIG. 9, the antenna section 211 may include more antennas.

Each of the first reception section 212 and the second reception section 216 includes a reception amplifier (AMP), a band-pass filter (BPF), and orthogonal demodulators 222 and 226. The orthogonal demodulators 222 and 226 each demodulate reception signals with a reception frequency adjusted by a frequency synthesizer (not shown).

The base band processing unit 220 decodes the reception signals demodulated by the first reception section 212 and the second reception section 216, and corrects errors thereof. Further, the base band processing unit 220 attempts to descramble the grant information received from the base station 100 by using the identification information that is defined in advance. Then, the base band processing unit 220 outputs, to the control unit 260, the grant information that has successfully performed descramble and decoding.

Each of the first transmission section 214 and the second transmission section 218 includes orthogonal modulators 224 and 228, a variable gain amplifier (VGA), a band-pass filter (BPF), a transmission amplifier (AMP), and an isolator (ISO). The orthogonal modulators 224 and 228 modulate transmission signals that are encoded by the base band processing unit 220 with a transmission frequency that is adjusted by a frequency synthesizer (not shown).

For example, the first reception section 212 can be used to receive downlink signals from the base station 100. The first transmission section 214 can be used to transmit uplink signals to the base station 100. The second reception section 216 can be used to receive radio signals from the terminal apparatus 300 which is the destination of relay. The second transmission section 218 can be used to transmit radio signals to the terminal apparatus 300 which is the destination of relay. Some of these sections may be operated at the same time.

The relay buffer 230 buffers traffic that has been decoded or not decoded yet until the traffic received from the base station 100 is relayed to the terminal. Further, the relay buffer 230 buffers traffic that has been decoded or not decoded yet until the traffic received from the terminal is relayed to the base station 100.

As shown in the example in FIG. 9, by including a circuit for relay independently of a circuit for a communication link with the base station 100, also during the relay period, the relay station 200 can maintain synchronization with the base station 100 properly and can monitor the grant information from the base station 100 consecutively.

(2) Network Communication Unit

The network communication unit 240 is a communication interface connected to the internet 14 shown in FIG. 1. The network communication unit 240 may relay traffic to be transmitted and received to/from the terminal via the internet 14 to the base station 100.

(3) Storage Unit

The storage unit 250 stores a program and data for operations of the relay station 200 by using a storage medium such as a hard disk or a semiconductor memory.

(4) Control Unit

The control unit 260 controls general operations of the relay station 200 by using a processor such as a CPU or a DSP. In this embodiment, the control unit 260 includes a relay control unit 262.

The relay control unit 262 makes the frame timing of the radio communication unit 210 synchronize with the frame timing of the base station 100 in advance and causes the radio communication unit 210 to monitor the grant information broadcasted on the downlink resource from the base station 100. Then, when the grant information is received by the radio communication unit 210, the relay control unit 262 relays traffic with the TDD scheme in the relay period associated with the grant information on the resource for relay specified by the grant information.

Figure 10:
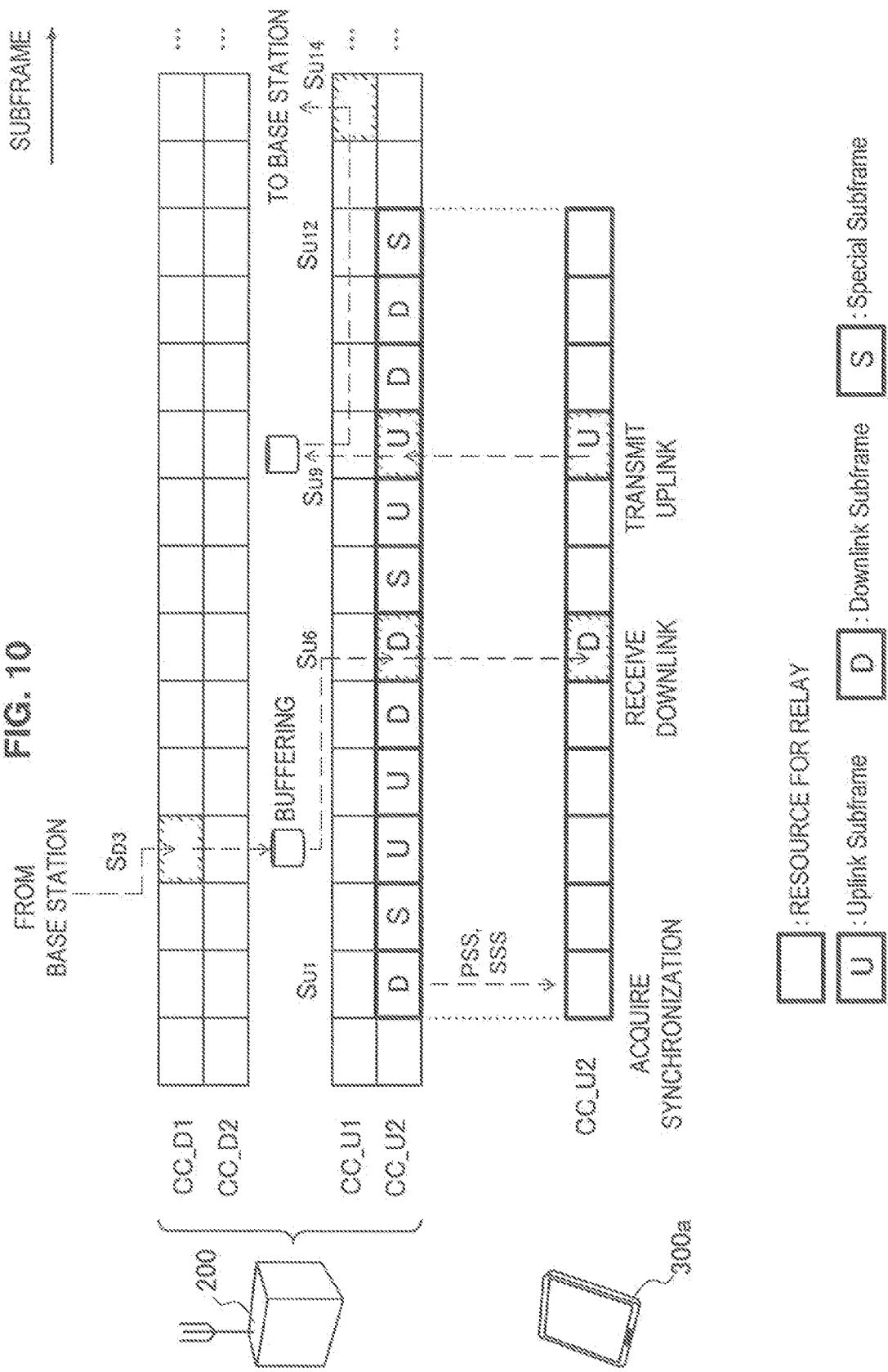
FIG. 10 is a diagram showing relay of traffic by a relay station.

FIG. 10 is a diagram showing relay of traffic by the relay station 200. In the example in FIG. 10, the period from a subframe $S_{U1}$ to a subframe $S_{U2}$ of the component carrier CC_U2 is granted as the relay period.

The relay control unit 262 first sets a certain uplink-downlink configuration (UL-DL configuration) during such a relay period. The UL-DL configuration refers to a pattern of a link direction for each subframe. In the example in FIG. 10, the link direction of a subframe that is labeled as "D" is a downlink, and this subframe is called downlink subframe. The link direction of a subframe that is labeled as "U" is an uplink, and this subframe is called uplink subframe. A subframe that is labeled as "S" is a special subframe. The special subframe is inserted to prevent temporal overlap of reception of a downlink signal and transmission of an uplink signal in a terminal owing to a propagation delay of a signal at a timing of switching the downlink subframe to the uplink subframe. In a TD-LTE scheme, as the UL-DL configuration indicating the set of link directions according to subframes for one radio frame, seven patterns of UL-DL configurations are defined in advance. The relay control unit 262 may set one of such UL-DL configurations that are defined in advance, as the relay period.

After setting the UL-DL configuration, the relay control unit 262 broadcasts a synchronization signal (e.g., PSS and SSS) in a predetermined downlink subframe. In the example in FIG. 10, the synchronization signal is broadcasted in the subframe $S_{U1}$. For example, the terminal apparatus 300a shown in FIG. 1 detects the synchronization signal from the relay station 200 and synchronizes with the relay station 200.

After that, for example, the relay station 200 receives traffic addressed to the terminal apparatus 300a from the base station 100 in a subframe $S_{D3}$ of the component carrier CC_D1 (Which is not the resource for relay). Then, the relay station 200 schedules transmission of the traffic to the terminal apparatus 300a (that is, relay) and notifies the terminal apparatus 300a about the scheduling information. Then, in accordance with the notified schedule, the relay station 200 relays the traffic that has been buffered temporarily to the terminal apparatus 300a in the downlink subframe (the subframe $S_{U6}$ in the example in FIG. 10).

Further, for example, when receiving a request of uplink transmission from the terminal apparatus 300a, the relay station 200 schedules the requested uplink transmission and notifies the terminal apparatus 300a about the scheduling information. Then, in accordance with the notified schedule, the relay station 200 receives the traffic from the terminal apparatus 300a in the uplink subframe (the subframe $S_{U9}$ in the example in FIG. 10). The traffic received here is buffered temporarily and is relayed from the relay station 200 to the base station 100 in a subframe $S_{U14}$ of the component carrier CC_U1 (which is not the resource for relay), for example.

[3-2. Example of Flow of Processing]

Figure 11:
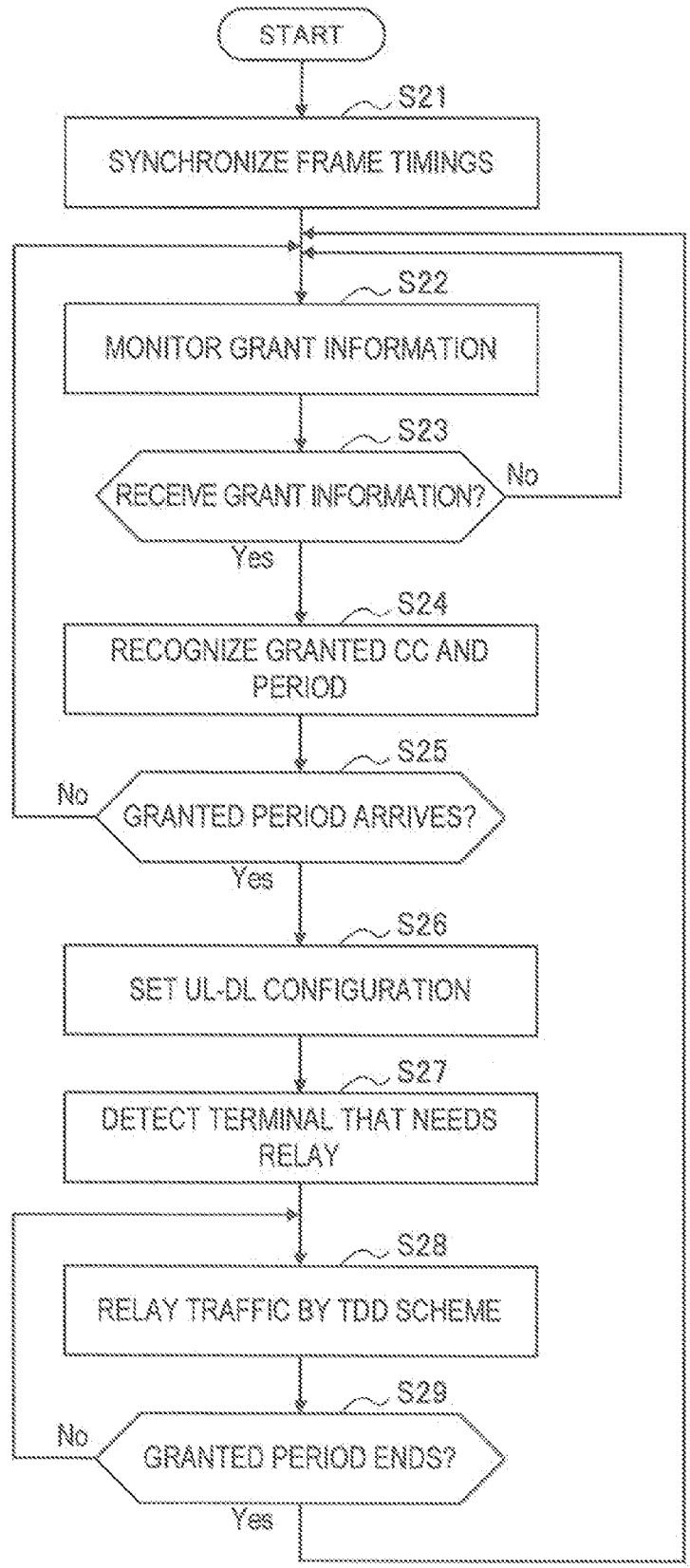
FIG. 11 is a flowchart showing an example of a flow of communication control processing by a relay station according to an embodiment.

FIG. 11 is a flowchart showing an example of a flow of communication control processing by the relay station 200 according to this embodiment.

Referring to FIG. 11, first, the relay control 262 makes the frame timing of the radio communication unit 210 synchronize with the frame timing of the base station 100 (step S21). Next, the relay control unit 262 causes the radio communication unit 210 to monitor the grant information broadcasted from the base station 100 on the downlink resource (step S22).

When the radio communication unit 210 receives the grant information (step S23), the relay control unit 262 recognizes the resource for relay specified by the received grant information and the period associated with the grant information (step S24). The monitoring of the grant information and the recognition of the resource for relay in a case in which the grant information is received may be repeated for each subframe.

When the relay period arrives (step S25), the relay control unit 262 first sets the UL-DL configuration during the relay period (step S26). Further, the relay control unit 262 detects a terminal that needs relay (step S27). For example, the relay control unit 262 may detect a terminal that needs relay by receiving an access request from the terminal or may detect a terminal that needs relay through signaling with the base station 100. Then, when the relay control unit 262 detects the terminal that needs relay, the relay control unit 262 relays traffic with the TDD scheme between the base station 100 and the detected terminal (step S28). The relay control unit 262 continues control of relay of traffic until the relay period ends (step S29).

4. CONFIGURATION OF TERMINAL

Figure 12:
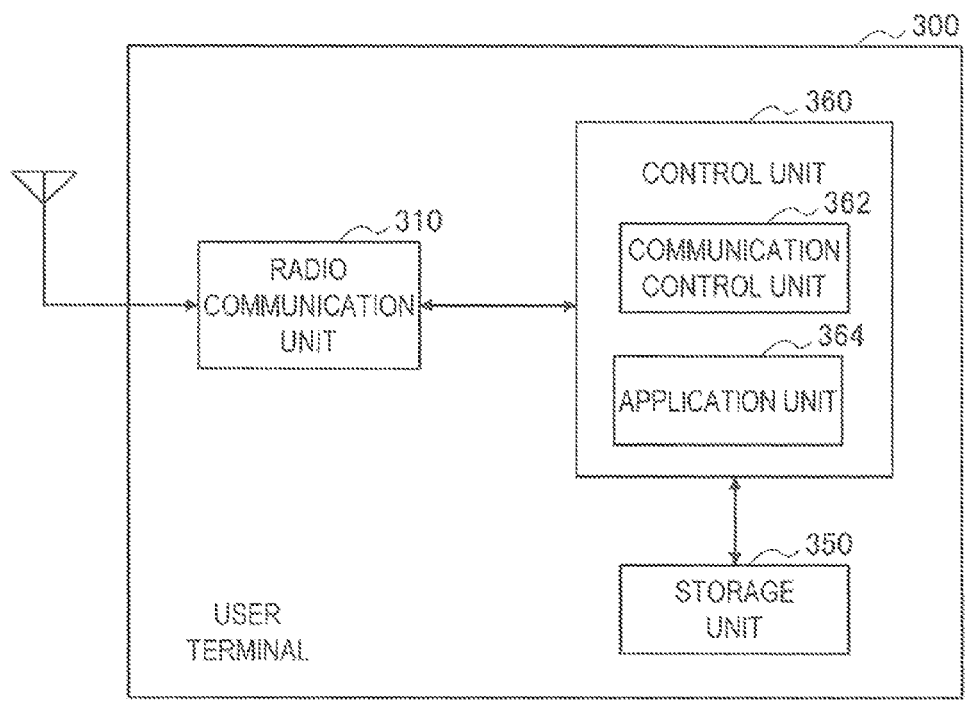
FIG. 12 is a block diagram showing an example of a configuration of a terminal apparatus according to an embodiment.

FIG. 12 is a block diagram showing an example of a configuration of the terminal apparatus 300 according to this embodiment. Referring to FIG. 12, the terminal apparatus 300 includes a radio communication unit 310, a storage unit 350, and a control unit 360.

(1) Radio Communication Unit

The radio communication unit 310 is a radio communication interface that is operated with the FDD scheme and the TDD scheme. The radio communication unit 310 is connected to the base station 100 in a case in which the quality of a communication channel with the base station 100 is excellent. Further, the radio communication unit 310 searches for the relay station 200 and is connected to the relay station 200 in a case in which the quality of the communication channel with the base station 100 is poor or in a case in which radio signals from the base station 100 cannot be received. While being connected to the relay station 200, the radio communication unit 310 transmits and receives radio signals with the TDD scheme.

(2) Storage Unit

The storage unit 350 stores a program and data for operations of the terminal apparatus 300 by using a storage medium such as a hard disk or a semiconductor memory.

(3) Control Unit

The control unit 360 controls general operations of the terminal apparatus 300 by using a processor such as a CPU or a DSP. In this embodiment, the control unit 360 includes a communication control unit 362 and an application unit 364.

The communication control unit 362 causes the radio communication unit 310 to measure the quality of the communication channel with the base station 100. In a case in which the measured quality is excellent, the communication control unit 362 causes the radio communication unit 310 to be connected to the base station 100. On the other hand, in a case in which the measured quality is not excellent, the communication control unit 362 searches for a neighboring relay station 200 and requests the detected relay station 200 of relay of traffic. Then, the communication control unit 362 makes the frame timing of the radio communication unit 310 synchronize with that of the relay station 200, and in accordance with the UL-DL configuration received from the relay station 200 and the scheduling information, the communication control unit 362 causes the radio communication unit 310 to transmit uplink traffic, or causes the radio communication unit 310 to receive downlink traffic.

The application unit 364 implements applications of an upper layer. The application unit 364 generates data traffic to be transmitted to another apparatus and outputs the generated data traffic to the radio communication unit 310. Further, the application unit 364 processes data traffic received by the radio communication unit 310 from another apparatus. The application implemented by the application unit 364 may be application having any purpose, such as reproduction of content, social networking, navigation, or Internet browsing.

5. CONCLUSION

The embodiments of the technique according to the present disclosure have been described above in detail with reference to FIG. 1 to FIG. 12. According to the above described embodiments, the grant information that specifies the resource for relay within the frequency resource assigned to the radio communication system operated with the FDD scheme is provided from the base station to the relay station. The grant information is associated with the period during which the use of the frequency resource is granted for relay. Then, during the period associated with the grant information, traffic is relayed on the resource for relay with the TDD scheme. Accordingly, in a recent radio communication environment in which the traffic amount always changes, by dynamically authorizing the control of relay to the relay station that relays traffic, the usage efficiency of the frequency resource can be maintained or improved while communication chances can be provided to more terminals.

Further, according to the above described embodiments, the resource for relay is included in the uplink resource of the radio communication system. Accordingly, interference due to relay of traffic can be controlled more easily on the base station side than in a case in which the downlink resource is relayed. Further, the resource for relay is specified in a unit of a component carrier. Accordingly, by utilizing the mechanism of communication control for each component carrier of the base station of the LTE-A scheme, it becomes possible to achieve dynamic control such as setting and release of the relay period at a low cost.

Further, according to the above described embodiments, the grant information is broadcasted as a piece of the scheduling information or the system information on the downlink resource of the radio communication system. The scheduling information and the system information is normally information that is monitored any time by the terminal apparatus. Accordingly, according to this configuration, it becomes possible to provide the grant information to the relay station in real time without additionally providing a channel dedicated to notification of the grant information. Further, the grant information is scrambled by using the identification information that is defined commonly for the apparatus that is to relay traffic. Accordingly, it becomes possible to provide the grant information by using the existing frame of signaling of the scheduling information.

Further, according to the above described embodiments, a resource that is determined to have a lower risk of giving interference to the adjacent cell is decided as the resource for relay, on the basis of the indicator for inter-cell interference coordination notified between cells of the radio communication system. Accordingly, it becomes possible to decide the resource for relay in a manner that the risk of interference accompanied by the dynamic decision of the resource for relay can be minimized.

Note that a series of control processing by each apparatus described in this specification may be achieved by using any of software, hardware, and a combination of software and hardware. A program constituting software is stored in a storage medium in advance, the medium being provided in the inside or outside of each apparatus, for example. When each program is executed, for example, the program is read by random access memory (RAM) and executed by a processor such as a CPU.

The preferred embodiments of the present disclosure have been described above in detail with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

A communication control apparatus including:

a communication unit configured to receive, from a base station of a radio communication system, grant information that specifies a resource for relay within a frequency resource assigned to a radio communication system operated with a frequency division duplex scheme, the resource for relay being granted to be used for relay of traffic; and a relay control unit configured to relay the traffic with a time division duplex scheme on the resource for relay during a period that is associated with the grant information.

(2)
The communication control apparatus according to (1), wherein the resource for relay is included in an up link resource of the radio communication system.

(3)
The communication control apparatus according to (1) or (2),
wherein the radio communication system is a system operated by using a plurality of component carriers, and
wherein the grant information specifies the resource for relay in a unit of a component carrier.

(4)
The communication control apparatus according to any one of (1) to (3),
wherein the communication unit receives the grant information as a piece of scheduling information or system information on a downlink resource of the radio communication system.

(5)
The communication control apparatus according to any one of (1) to (4),
wherein the communication unit descrambles the grant information by using identification information defined commonly for an apparatus that decodes the grant information.

(6)
The communication control apparatus according to any one of (1) to (5),
wherein the relay control unit makes a frame timing for relaying the traffic synchronize with a frame timing of the radio communication system.

(7)
The communication control apparatus according to any one of (1) to (6),
wherein the communication control apparatus is a user terminal to be connected to the radio communication system.

(8)
A communication control apparatus including:
a communication control unit configured to operate, on a frequency resource assigned to a radio communication system, the radio communication system with a frequency division duplex scheme;
a relay control unit configured to decide a resource for relay within the frequency resource, and to generate grant information that is associated with a period during which relay is granted, the resource for relay being granted to be used for relay of traffic; and
a communication unit configured to transmit the generated grant information.

(9)
The communication control apparatus according to (8),
wherein the resource for relay is included in an uplink resource of the radio communication system.

(10)
The communication control apparatus according to (8) or (9),
wherein the communication control unit operates the radio communication system by using a plurality of component carriers, and
wherein the relay control unit decides the resource for relay in a unit of a component carrier.

(11)
The communication control apparatus according to any one of (8) to (10),
wherein the communication unit broadcasts the grant information as a piece of scheduling information or system information on a downlink resource.

(12)
The communication control apparatus according to any one of (8) to (11),
wherein the relay control unit decides, as the resource for relay, a resource that is determined to have a lower risk of giving interference to an adjacent cell on the basis of an indicator for inter-cell interference coordination notified among cells of the radio communication system.

(13)
The communication control apparatus according to (12),
wherein the indicator includes at least one of a relative narrow band TX power indicator (RNTPI), a high interference indicator (HII), and an overload indicator (OI).

(14)
The communication control apparatus according to any one of (8) to (11),
wherein the relay control unit notifies a base station of a second cell about an indicator for inter-cell interference coordination in a manner that, in the resource for relay that is granted for a first cell, interference with the second cell adjacent to the first cell is suppressed.

(15)
The communication control apparatus according to any one of (8) to (14),
wherein the communication unit scrambles the grant information by using identification information defined commonly for an apparatus that decodes the grant information.

(16)
A communication control method including:
receiving, from a base station of a radio communication system, grant information that specifies a resource for relay within a frequency resource assigned to the radio communication system operated with a frequency division duplex scheme, the resource for relay being granted to be used for relay of traffic; and
relaying the traffic with a time division duplex scheme on the resource for relay during a period that is associated with the grant information.

(17)
A communication control method including:
operating a radio communication system with a frequency division duplex scheme on a frequency resource assigned to the radio communication system;
deciding a resource for relay granted to be used for relay of traffic within the frequency resource;
generating the grant information that specifies the resource for relay and that is associated with a period during which relay is granted; and
transmitting the generated grant information to an apparatus that traffic.

REFERENCE SIGNS LIST 1 communication control system
100 communication control apparatus (base station)
110 radio communication unit
162 communication control unit
164 relay control unit
200 communication control apparatus (relay station)
210 radio communication unit 262 relay control unit
300 terminal apparatus

The invention claimed is:

1. A communication control apparatus comprising:
a communication unit configured to receive on a downlink resource, from a first base station of a radio communication system, grant information that specifies an uplink resource for relay within a frequency resource assigned to the radio communication system operated with a frequency division duplex scheme, the uplink resource for relay being granted to be used for relay of traffic; and
a relay control unit configured to relay the traffic with a time division duplex scheme on the uplink resource for relay during a period that is associated with the grant information,
wherein the relay control unit decides a preferred uplink resource for relay out of the specified uplink resource for relay according to an indicator for inter-cell interference coordination notified to the first base station by at least one second base station of the radio communication system,
wherein the indicator comprises a relative narrow band transmission power indicator (RNTPI) that corresponds to a risk of interference among adjacent cells of the first base station and the at least one second base station, and
wherein the communication unit and the relay control unit are each implemented via at least one processor.

2. The communication control apparatus according to claim 1,
wherein the radio communication system is a system operated by using a plurality of component carriers, and
wherein the grant information specifies the uplink resource for relay in a unit of a component carrier within the period that is associated with the grant information.

3. The communication control apparatus according to claim 1,
wherein the communication unit receives the grant information as a piece of scheduling information or system information on the downlink resource of the radio communication system.

4. The communication control apparatus according to claim 1,
wherein the communication unit descrambles the grant information by using identification information defined commonly for an apparatus that decodes the grant information.

5. The communication control apparatus according to claim 1,
wherein the relay control unit makes a frame timing for relaying the traffic synchronize with a frame timing of the radio communication system.

6. The communication control apparatus according to claim 1,
wherein the communication control apparatus is a user terminal to be connected to the radio communication system.

7. A communication control apparatus comprising:
a communication control unit configured to operate, on a frequency resource assigned to a first base station of a radio communication system, the radio communication system with a frequency division duplex scheme;
a relay control unit configured to decide an uplink resource for relay within the frequency resource, and to generate grant information that is associated with a period during which relay is granted, the uplink resource for relay being granted to be used for relay of traffic; and
a communication unit configured to transmit the generated grant information on a downlink resource,
wherein the relay control unit decides the uplink resource for relay according to an indicator for inter-cell interference coordination notified to the first base station by at least one second base station of the radio communication system,
wherein the indicator comprises a relative narrow band transmission power indicator (RNTPI) that corresponds to a risk of interference among adjacent cells of the first base station and the at least one second base station, and
wherein the communication control unit, the relay control unit, and the communication unit are each implemented via at least one processor.

8. The communication control apparatus according to claim 7,
wherein the communication control unit operates the radio communication system by using a plurality of component carriers, and
wherein the relay control unit decides the uplink resource for relay in a unit of a component carrier within the period during which the relay is granted.

9. The communication control apparatus according to claim 7,
wherein the communication unit broadcasts the grant information as a piece of scheduling information or system information on the downlink resource.

10. The communication control apparatus according to claim 7,
wherein the communication unit scrambles the grant information by using identification information defined commonly for an apparatus that decodes the grant information.

11. A communication control method, implemented via at least one processor, the method comprising:
receiving on a downlink resource, from a first base station of a radio communication system, grant information that specifies an uplink resource for relay within a frequency resource assigned to the first base station of the radio communication system operated with a frequency division duplex scheme, the uplink resource for relay being granted to be used for relay of traffic; and
relaying the traffic with a time division duplex scheme on the uplink resource for relay during a period that is associated with the grant information,
wherein the uplink resource for relay is specified according to an indicator for inter-cell interference coordination notified to the first base station by at least one second base station of the radio communication system, and
wherein the indicator comprises a relative narrow band transmission power indicator (RNTPI) that corresponds to a risk of interference among adjacent cells of the first base station and the at least one second base station.

12. A communication control method, implemented via at least one processor, the method comprising:
operating a radio communication system with a frequency division duplex scheme on a frequency resource assigned to a first base station of the radio communication system;
deciding an uplink resource for relay granted to be used for relay of traffic within the frequency resource;

generating the grant information that specifies the uplink resource for relay and that is associated with a period during which relay is granted; and transmitting the generated grant information to an apparatus that relays the traffic, wherein the uplink resource for relay is decided according to an indicator for inter-cell interference coordination notified to the first base station by at least one second base station of the radio communication system, wherein the indicator comprises a relative narrow band transmission power indicator (RNTPI) that corresponds to a risk of interference among adjacent cells of the first base station and the at least one second base station.

* * * * *